(No Model.)
W. FALLON.
PERFORATING TOOL.
No. 407,068. Patented July 16, 1889.
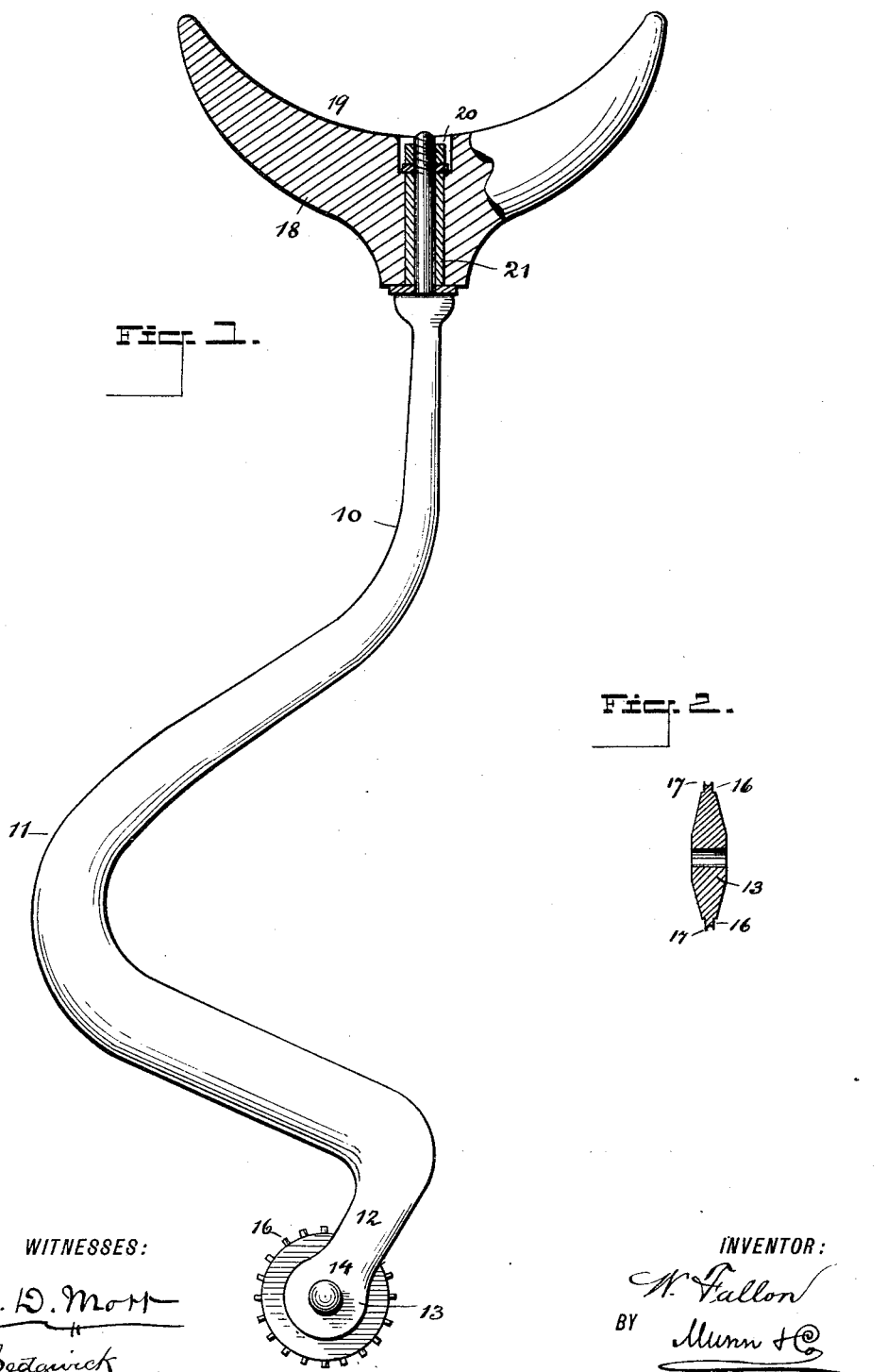
WITNESSES:
D. D. Mott
C. Sedgwick
INVENTOR:
W. Fallon
BY Munn & Co.
ATTORNEYS.
N. PETERS, Photo-Lithographer, Washington, D. C.

UNITED STATES PATENT OFFICE.

WILLIAM FALLON, OF NEWBURG, NEW YORK.

PERFORATING-TOOL.

SPECIFICATION forming part of Letters Patent No. 407,068, dated July 16, 1889.

Application filed September 15, 1888. Serial No. 285,501. (No model.)

*To all whom it may concern:*

Be it known that I, WILLIAM FALLON, of Newburg, in the county of Orange and State of New York, have invented a new and Improved Perforating-Tool, of which the following is a full, clear, and exact description.

My invention relates to an improvement in perforating-tools, and has for its object to provide a device whereby patterns and similar articles may be expeditiously, conveniently, and neatly perforated; and the further object of the invention is to provide a tool upon which pressure may be exerted without inconvenience to the operator, and wherein the perforating-wheel while under pressure may be guided with little effort in any direction.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1 is a side elevation of the device, partly in section; and Fig. 2 is a diametrical section of the wheel.

In carrying out the invention, the shank or body of the device consists of a bar 10, bent in V shape, as at 11, near the lower end 12, which lower end is bent slightly backward in direction of the V. The lower end 12 is vertically slotted to receive a perforating or marking wheel 13, which wheel is pivotally attached by a suitable pin 14.

The marking-wheel 13 consists of a disk provided upon the periphery with a series of spaced solid pins 16, having the outer ends concaved to form the cutting-edges 17, as best shown in Fig. 2.

A shoulder-piece 18 is swiveled upon the upper end of the shank, which is left straight, the upper face of the said shoulder-piece 18 being concaved, as illustrated at 19, in like manner to a crutch-arm.

In attaching the shoulder-piece to the shank, the latter is usually reduced at the upper end and threaded at the extremity, as shown in Fig. 1, and the shoulder-piece is provided with a central transverse bore having a countersink 20 in the upper end. Within the bore a sleeve 21 is fitted, adapted to slide over the reduced end of the shank, and the shoulder-piece is prevented from leaving the body by a nut and washer screwed upon the shank within the countersink. The shoulder-piece may, however, be attached in any other approved manner.

In operation, the shoulder-piece is placed under the arm, whereby suitable pressure may be exerted upon the wheel, and said wheel is guided by grasping the lower arm of the V section of the shank with one hand at or near the intersection thereof with the wheel-carrying end of the shank.

Having thus fully described my invention, I claim as new and desire to secure by Letters Patent—

1. A perforating-tool consisting of a shank bent in V shape near the end, and having the lower end bent slightly back in direction of the V, a marking-wheel pivoted in the said lower end of the shank, and a shoulder-piece swiveled to the upper end of said shank, substantially as shown and described.

2. A marking-wheel consisting of a disk having a series of solid pins upon the periphery, provided with a recess in the outer end producing a cutting-edge, substantially as shown and described.

WM. FALLON.

Witnesses:
J. F. ACKER, Jr.,
C. SEDGWICK.